(12) United States Patent
Ando et al.

(10) Patent No.: US 12,280,835 B2
(45) Date of Patent: Apr. 22, 2025

(54) VEHICLE BODY LOWER STRUCTURE

(71) Applicant: Honda Motor Co., Ltd., Tokyo (JP)

(72) Inventors: Kenichi Ando, Saitama (JP); Kei Ambo, Saitama (JP); Yuki Nakamura, Saitama (JP); Yoshiteru Hoshida, Tokyo (JP); Hidefumi Nihei, Tokyo (JP); Yasunari Miyauchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 286 days.

(21) Appl. No.: 17/955,566

(22) Filed: Sep. 29, 2022

(65) Prior Publication Data

US 2023/0094082 A1  Mar. 30, 2023

(30) Foreign Application Priority Data

Sep. 30, 2021 (CN) ........................... 202111163719.3

(51) Int. Cl.
*B62D 35/02* (2006.01)
(52) U.S. Cl.
CPC .................................. *B62D 35/02* (2013.01)
(58) Field of Classification Search
None
See application file for complete search history.

(56) References Cited

U.S. PATENT DOCUMENTS

| | | | |
|---|---|---|---|
| 4,119,339 A * | 10/1978 | Heimburger | B62D 35/005 296/180.5 |
| 10,814,922 B2 * | 10/2020 | Mandl | B62D 35/02 |
| 10,953,934 B2 | 3/2021 | Herlem | |
| 2017/0166267 A1 * | 6/2017 | Ribaldone | B62D 35/005 |

FOREIGN PATENT DOCUMENTS

DE            4229945 A1 *  3/1994  ............... B60T 5/00

* cited by examiner

*Primary Examiner* — Joseph D. Pape
(74) *Attorney, Agent, or Firm* — JCIPRNET

(57) ABSTRACT

The disclosure provides a vehicle body lower structure, which may improve aerodynamic performance and inhibit the airflow guiding plate from being over-expanded or detached. The vehicle body lower structure includes an airflow guiding plate that is arranged on the vehicle body of a vehicle and is movable between a receiving position covering the lower part of the vehicle body and a deploying position protruding downward. The vehicle body lower structure further includes: a hook member, which is provided on the upper surface of the airflow guiding plate. When the airflow guiding plate is in the deploying position, the hook member is locked onto the buckle part of the vehicle body. When the airflow guiding plate is located at the receiving position, the hook member is separated from the buckle part of the vehicle body.

6 Claims, 10 Drawing Sheets

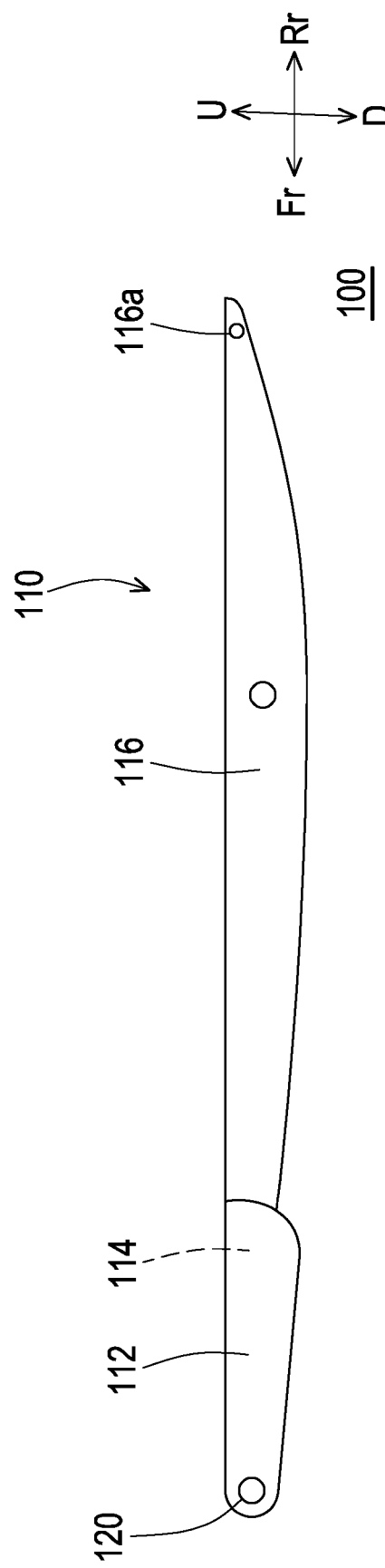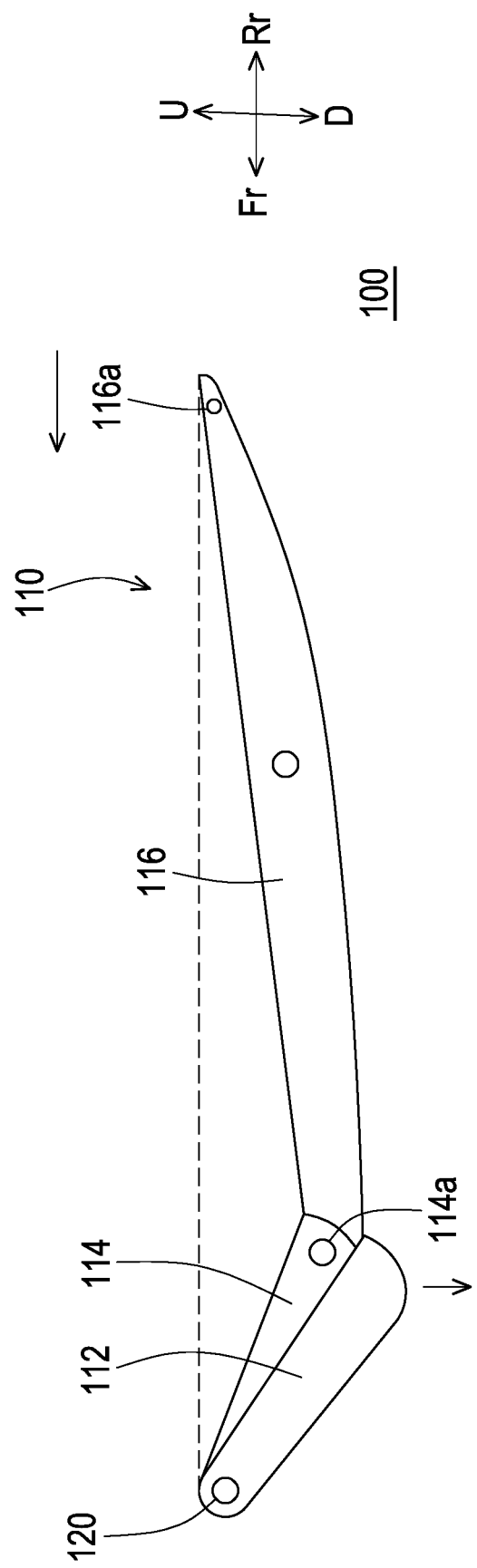
FIG. 4A
FIG. 4B

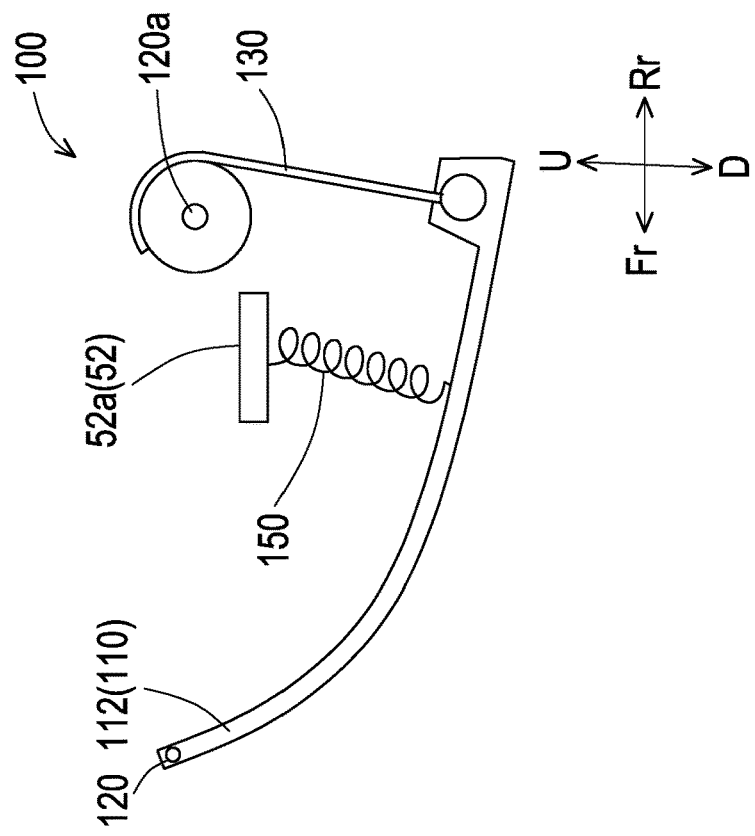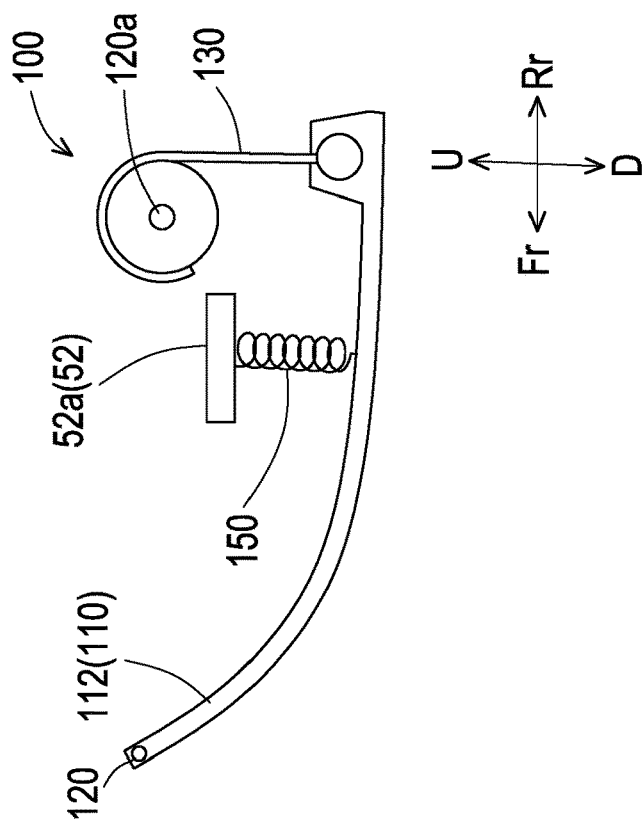

VEHICLE BODY LOWER STRUCTURE

CROSS-REFERENCE TO RELATED APPLICATION

This application claims the priority benefit of China application no. 202111163719.3, filed on Sep. 30, 2021. The entirety of the above-mentioned patent application is hereby incorporated by reference herein and made a part of this specification.

BACKGROUND

Technical Field

The disclosure relates to a vehicle body structure, in particular to a vehicle body lower structure.

Description of Related Art

In conventional technology, a vehicle body lower structure composed of a plurality of plates or frames is mounted on the vehicle body of the vehicle. In order to improve energy efficiency of the vehicle and reduce impacts caused by the vehicle on the destruction of the natural environment, design is made to the shape of the vehicle. Specifically, in order to further improve the aerodynamic performance, in addition to the fairing effect of the existing under cover, it is also necessary to create an aerodynamically favorable flow through pressure distribution control. For example, Patent Document 1 (US patent publication U.S. Ser. No. 10/953, 934) discloses a vehicle body lower structure, which includes an airflow guiding plate movable between a receiving position covering the lower part of the vehicle body and a deploying position protruding downward, thereby further improving the aerodynamic performance under the center of the vehicle. However, when improving the plate body and the like of the vehicle body lower structure, it is also required to take into consideration the layout of the parts originally placed in the lower part of the vehicle body. Therefore, it is essential to develop a mass-produced device that can meet aerodynamic performance and layout requirements.

SUMMARY

The disclosure provides a vehicle body lower structure, which may improve aerodynamic performance and inhibit the airflow guiding plate from being over-expanded or detached.

The present disclosure provides a vehicle body lower structure, including an airflow guiding plate that is arranged on the vehicle body of a vehicle and is movable between a receiving position covering the lower part of the vehicle body and a deploying position protruding downward. The vehicle body lower structure further includes: a hook member, which is provided on the upper surface of the airflow guiding plate. When the airflow guiding plate is located at the receiving position, the hook member is separated from the buckle part of the vehicle body. When the airflow guiding plate is in the deploying position, the hook member is locked onto the buckle part of the vehicle body.

In an embodiment of the disclosure, the front end of the airflow guiding plate is rotatably connected to the vehicle body through a shaft member extending in the left-right direction of the vehicle. The hook member is fixed to the buckle part at a position further rearward than the shaft member.

In an embodiment of the disclosure, the hook member has a claw part protruding toward the rear of the vehicle, and the claw part is located at a position higher than the buckle part.

Based on the above, in the vehicle body lower structure of the present disclosure, the airflow guiding plate is provided on the vehicle body of the vehicle, and is movable between a receiving position covering the lower part of the vehicle body and a deploying position protruding downward. Specifically, the vehicle body lower structure further includes a hook member, which is provided on the upper surface of the airflow guiding plate. When the airflow guiding plate is located at the receiving position, the hook member is separated from the buckle part of the vehicle body. When the airflow guiding plate is in the deploying position, the hook member is locked onto the buckle part of the vehicle body. In this manner, when the airflow guiding plate is located in the deploying position, the airflow guiding plate may be supported by the buckle part of the hook member locked onto the vehicle body, thereby inhibiting the airflow guiding plate from being over-expanded or detached. Accordingly, the vehicle body lower structure of the present disclosure may improve aerodynamic performance and inhibit the airflow guiding plate from being over-expanded or detached.

In order to make the above-mentioned features and advantages of the present disclosure more comprehensible, the following embodiments are given and described in detail with the accompanying drawings as follows.

BRIEF DESCRIPTION OF THE DRAWINGS

FIG. 4A and FIG. 4B are schematic side views of the airflow guiding plate shown in FIG. 3 when the airflow guiding plate is in the receiving position and the deploying position.

FIG. 6A to FIG. 6D are schematic side views of the belt member shown in FIG. 5 when the airflow guiding plate is in the receiving position, the deploying position, encountering an obstacle, and after passing through the obstacle.

DESCRIPTION OF THE EMBODIMENTS

Figure 1:
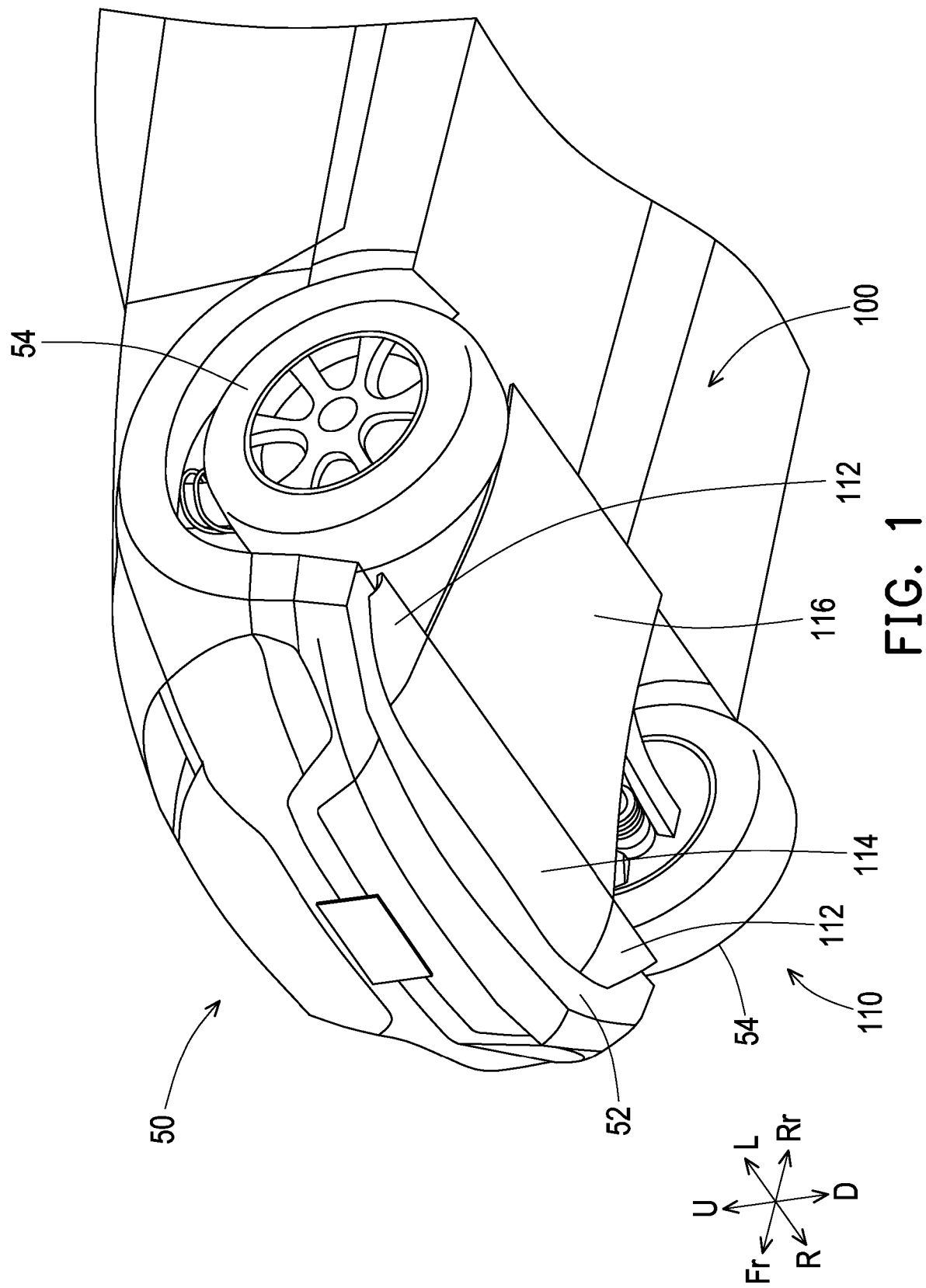
FIG. 1 is a schematic perspective view of a vehicle body lower structure applied to a vehicle body of a vehicle according to an embodiment of the present disclosure.
Figure 2:
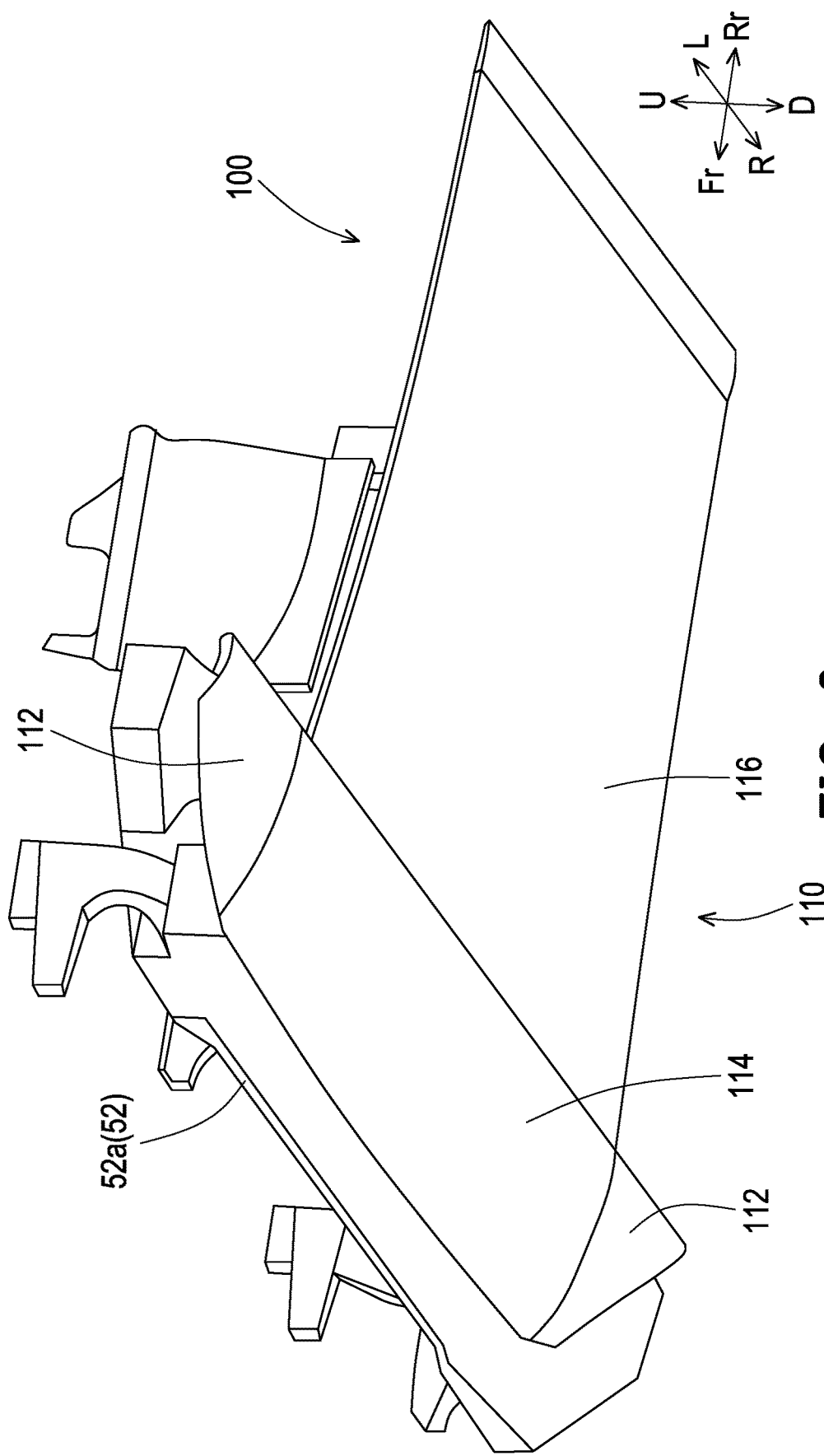
FIG. 2 is a schematic perspective view of the vehicle body lower structure shown in FIG. 1 when viewed from the front to the back and from the bottom to the top.
Figure 3:
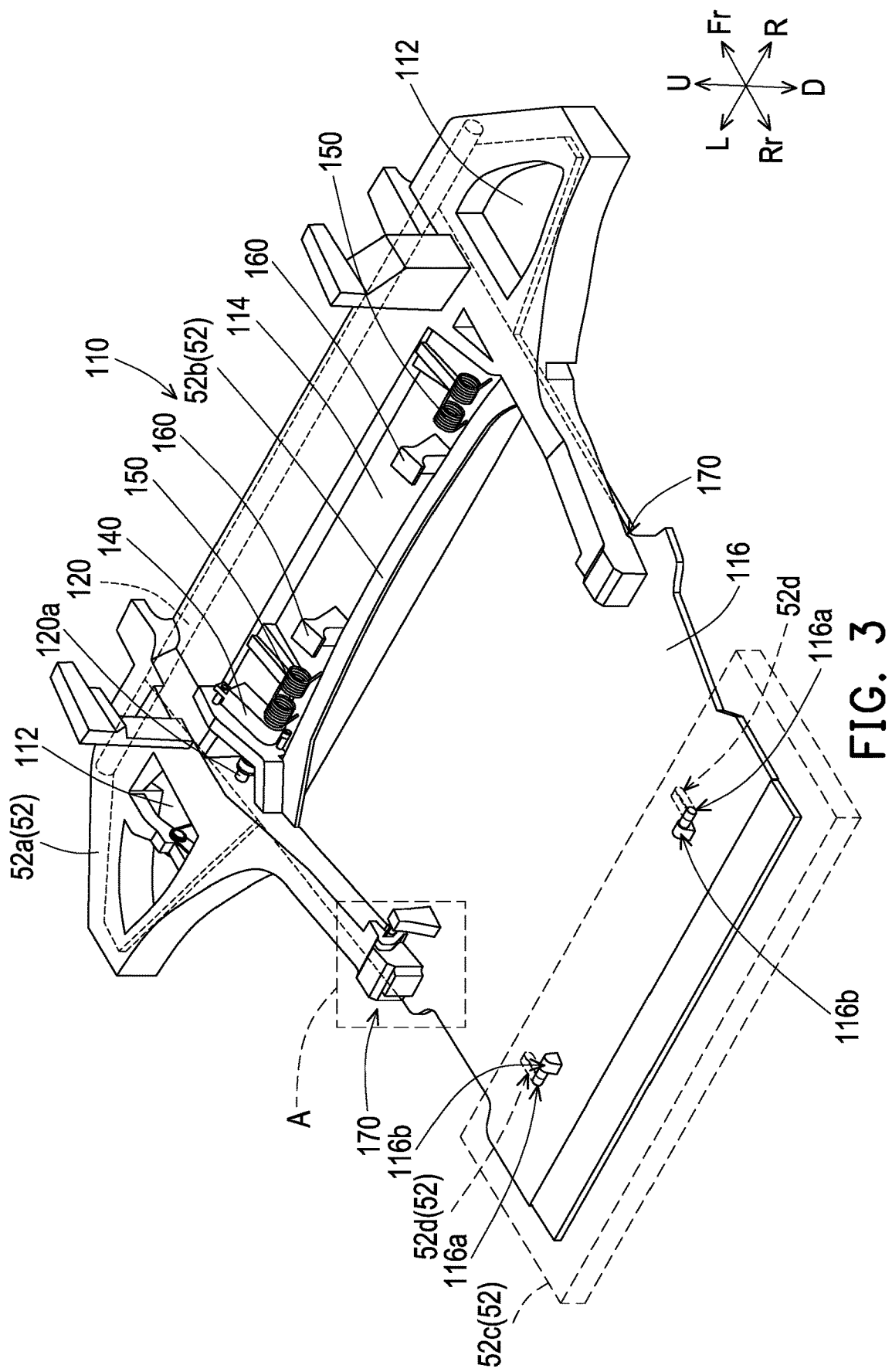
FIG. 3 is a schematic perspective view of the vehicle body lower structure shown in FIG. 2 when viewed from the back to the front and from the top to the bottom.
Figure 5:
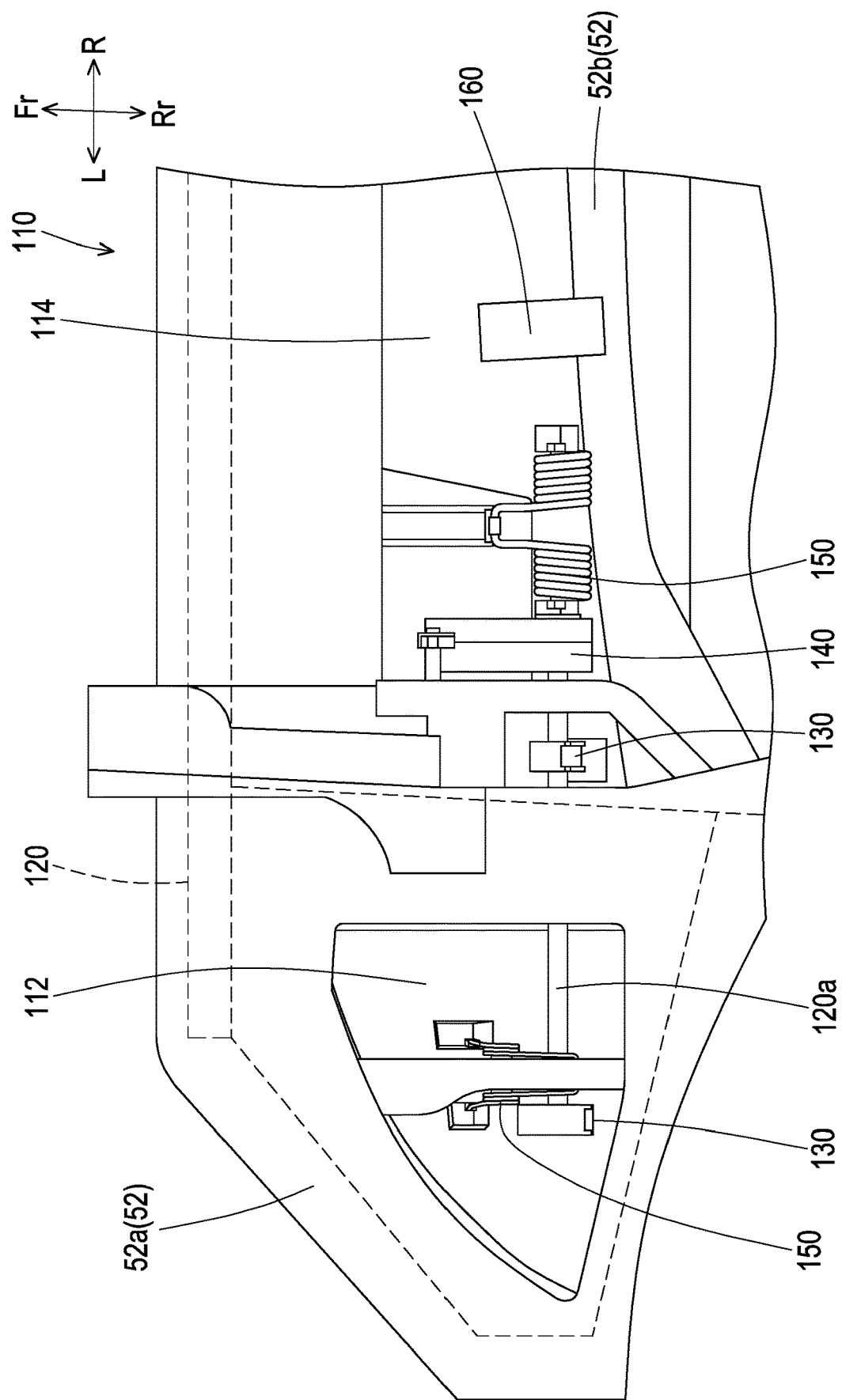
FIG. 5 is a schematic top view of one side of the vehicle body lower structure shown in FIG. 3.
Figure 6D:
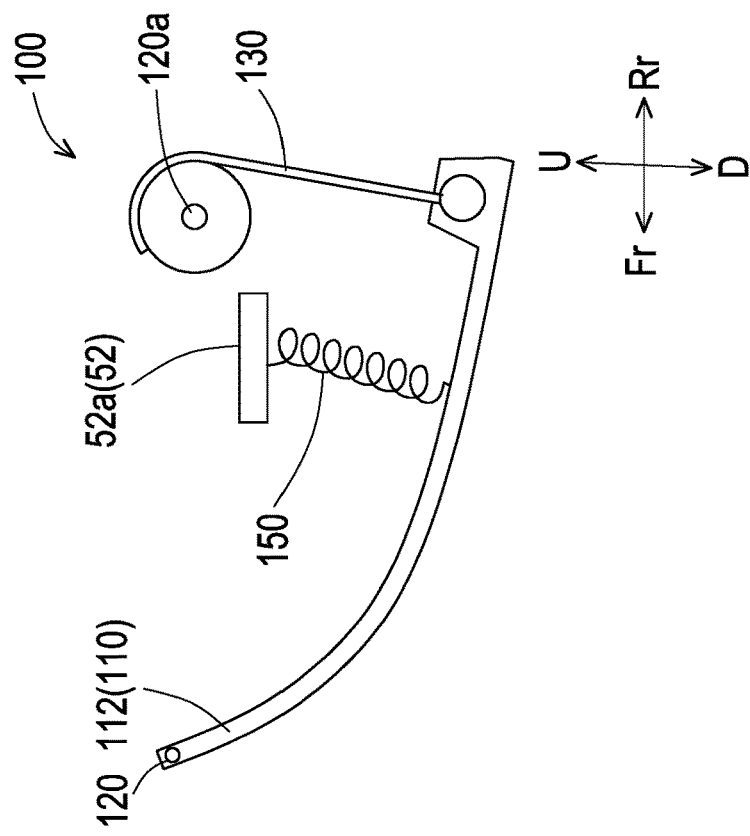
Figure 7A:
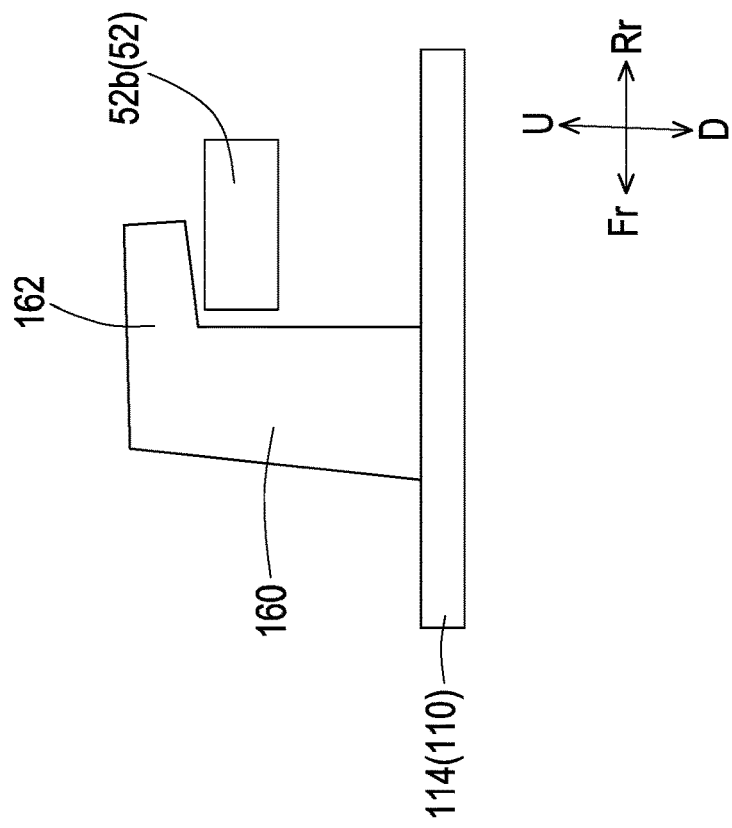
FIG. 7A and FIG. 7B are schematic side views of the hook member shown in FIG. 5 when the airflow guiding plate is in the receiving position and the deploying position.
Figure 7B:
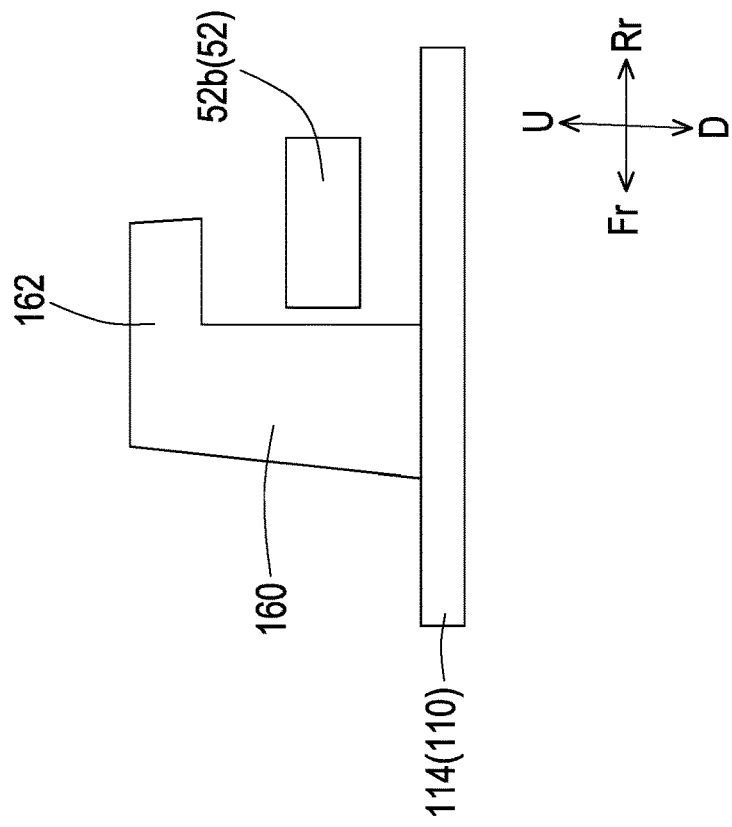
Figure 8:
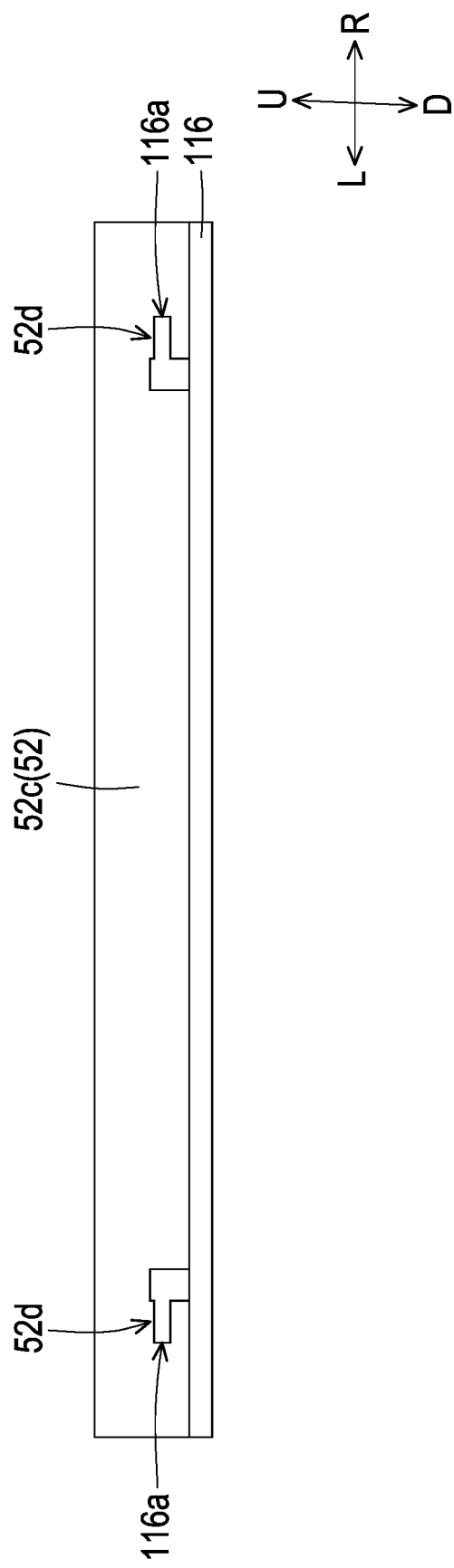
FIG. 8 is a schematic plan view of the vehicle body lower structure shown in FIG. 3 at the rear end of the airflow guiding plate.
Figure 9:
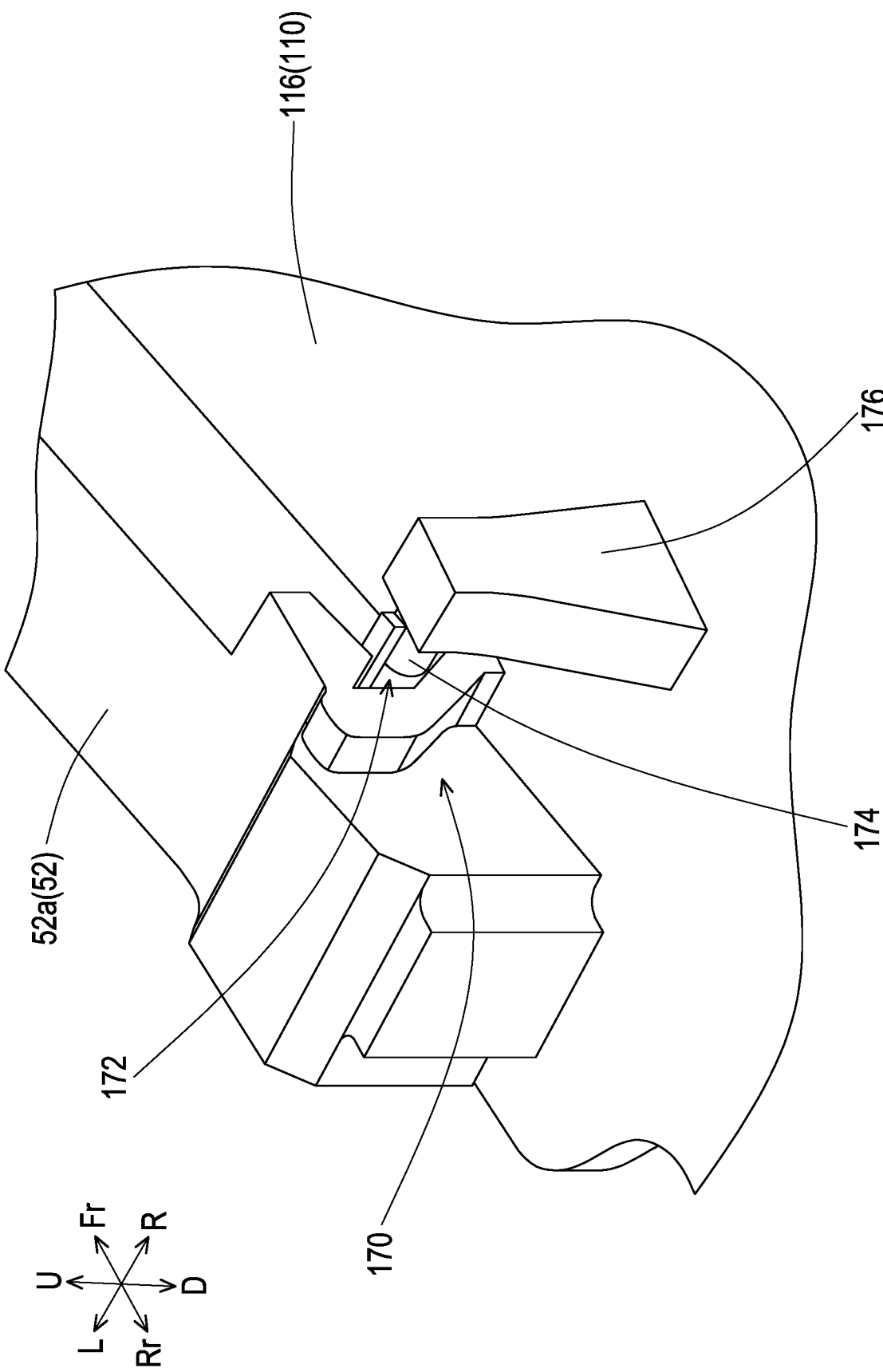
FIG. 9 is a partially enlarged schematic view of the vehicle body lower structure shown in FIG. 3 at the rear end of the airflow guiding plate.

Reference will now be made in detail to the exemplary embodiments of the present disclosure, examples of which are illustrated in the accompanying drawings. FIG. 1 is a schematic perspective view of a vehicle body lower structure applied to a vehicle body of a vehicle according to an embodiment of the present disclosure; FIG. 2 is a schematic perspective view of the vehicle body lower structure shown in FIG. 1 when viewed from the front to the back and from the bottom to the top; FIG. 3 is a schematic perspective view of the vehicle body lower structure shown in FIG. 2 when viewed from the back to the front and from the top to the bottom; FIG. 4A and FIG. 4B are schematic side views of the airflow guiding plate shown in FIG. 3 when the airflow guiding plate is in the receiving position and the deploying position; FIG. 5 is a schematic top view of one side of the vehicle body lower structure shown in FIG. 3; FIG. 6A to FIG. 6D are schematic side views of the belt member shown in FIG. 5 when the airflow guiding plate is in the receiving position, the deploying position, encountering an obstacle, and after passing through the obstacle; FIG. 7A and FIG. 7B are schematic side views of the hook member shown in FIG. 5 when the airflow guiding plate is in the receiving position and the deploying position; FIG. 8 is a schematic plan view of the vehicle body lower structure shown in FIG. 3 at the rear end of the airflow guiding plate; FIG. 9 is a partially enlarged schematic view of the vehicle body lower structure shown in FIG. 3 at the rear end of the airflow guiding plate. The application and specific structure of the vehicle body lower structure 100 in this embodiment will be described below with reference to FIG. 1 to FIG. 9. However, the vehicle body lower structure 100 in this embodiment is only one example of the present disclosure, and the present disclosure is not limited thereto.

Referring to FIG. 1 to FIG. 3, in this embodiment, the vehicle body lower structure 100 is suitable for being disposed at the lower part of the vehicle 50 (shown in FIG. 1), for example, at the lower part of the front of the vehicle 50, and adjacent to a pair of left and right front wheels 54 at the front of the vehicle body 52 of the vehicle 50. Specifically, the vehicle body lower structure 100 includes an airflow guiding plate 110 arranged on the vehicle body 52 of the vehicle 50 (as shown in FIG. 1) and is movable between a receiving position that may cover the lower part of the vehicle body 52 (as shown in FIG. 4A) and a deploying position that protrudes downward (as shown in FIG. 4B). The airflow guiding plate 110 is set on the vehicle body 52, for example, arranged on the vehicle body 52 in a rotatable manner. The description of covering the lower part of the vehicle body 52 means that the airflow guiding plate 110 covers at least a part of the lower part of the vehicle body 52, but it is not limited that the airflow guiding plate 110 is parallel to the horizontal plane where the vehicle 50 is located or the flat surface formed by the vehicle body 52. The airflow guiding plate 110 may also have an included angle when in the receiving position and therefore is inclined. The deploying position refers to a position lower than the receiving position. During the process of driving the vehicle 50, the airflow guiding plate 110 moves from the receiving position (as shown in FIG. 4A) to the deploying position (as shown in FIG. 4B), so as to be able to guide the airflow that flows from the front to the back (for example, flowing from the vehicle front direction Fr to the vehicle rear direction Rr shown in FIG. 1). As such, the aerodynamic performance may be effectively improved.

Hereinafter, the specific structure of the vehicle body lower structure 100 will be described in four parts. The first part of the present disclosure describes the front structure of the airflow guiding plate 110 used for the vehicle body lower structure 100. The second part of the present disclosure describes the anti-collision structure of the airflow guiding plate 110 used for the vehicle body lower structure 100. The third part of the present disclosure describes the anti-overexpansion structure of the airflow guiding plate 110 used for the vehicle body lower structure 100. The fourth part of the present disclosure describes the rear structure of the airflow guiding plate 110 used for the vehicle body lower structure 100. However, the present disclosure is not limited thereto, which may be adjusted according to requirements.

First, the front structure of the airflow guiding plate 110 used for the vehicle body lower structure 100 is described in the first part of the present disclosure. Please refer to FIG. 1 to FIG. 3. In this embodiment, the airflow guiding plate 110 includes a first airflow guiding plate 112 and a second airflow guiding plate 114. The first airflow guiding plate 112 is arranged in front of the left and right front wheels 54 of the vehicle 50 (as shown in FIG. 1). For example, a pair of first airflow guiding plates 112 are arranged in front of the pair of front wheels 54. Correspondingly, the second airflow guiding plate 114 is arranged under the center of the vehicle body 52, for example, between a pair of the first airflow guiding plates 112. Specifically, the second airflow guiding plate 114 may also be called the front airflow guiding plate. The rear structure of the airflow guiding plate 110 further includes a rear airflow guiding plate 116 (as described in the fourth part of the description), and the first airflow guiding plate 112 functions as a fairing at the left and right sides of the second airflow guiding plate 114. Thus, the front structure of the airflow guiding plate 110 is divided into two parts (i.e., the first airflow guiding plate 112 and the second airflow guiding plate 114), so different settings may be made. For example, the protruding amount of the first airflow guiding plate 112 is different from the protruding amount of the second airflow guiding plate 114 in the deploying position (shown in FIG. 4B).

Specifically, in this embodiment, as shown in FIG. 3, FIG. 4A and FIG. 4B, the vehicle body lower structure 100 further includes a shaft member 120. The shaft member 120 extends in the left-right direction (for example, the vehicle left direction L and the vehicle right direction R shown in FIG. 3) of the vehicle, thereby rotatably connecting the front end of the airflow guiding plate 110 (e.g., the end portion corresponding to the vehicle front direction Fr in FIG. 3) to the vehicle body 52. That is, each of the first airflow guiding plate 112 and the second airflow guiding plate 114 is rotatably connected to the vehicle body 52 at the front end thereof through the shaft member 120 extending in the left-right direction of the vehicle. For example, each of them is rotatably provided on the front frame 52a of the vehicle body 52. Specifically, although the drawings show that the first airflow guiding plate 112 and the second airflow guiding plate 114 are rotatably connected to the vehicle body 52 through the same shaft member 120, in other embodiments that are not shown, the first airflow guiding plate 112 and the second airflow guiding plate 114 may also be provided on the front frame 52a of the vehicle body 52 through different shaft members. The different shaft members may extend along the same rotation axis, or be parallel to each other but staggered in the back and forth direction, or the like. In addition, when the rotation axes of the first airflow guiding plate 112 and the second airflow guiding plate 114 are staggered in the back and forth direction, the first airflow guiding plate 112 may also be set as a single plate positioned in front of and on the left and right sides of the second airflow guiding plate 114 (i.e., surrounding three sides of the second airflow guiding plate 114), the present disclosure is not limited thereto.

Furthermore, in this embodiment, as shown in FIG. 1 and FIG. 2, the rear end of the first airflow guiding plate 112 is connected to the vehicle body 52 through a belt member used for the anti-collision structure to be described later (described in the second part of the present disclosure). Correspondingly, the rear end of the second airflow guiding plate 114 is connected to the rear airflow guiding plate 116 to be described later (described in the fourth section of the present disclosure), and may be further connected to the vehicle body 52 in the deploying position through the hook member used for the anti-overexpansion structure described later (described in the third part of the present disclosure). The specific structures of the anti-collision structure, the anti-over-expansion structure and the rear airflow guiding plate 116 will be explained in the second part to the fourth part below.

Therefore, in this embodiment, when the airflow guiding plate 110 is located at the receiving position (as shown in FIG. 4A), the first airflow guiding plate 112 and the second airflow guiding plate 114 cover the lower part of the vehicle body 52. Moreover, in the side view direction, the first airflow guiding plate 112 on the outside overlaps at least a part of the second airflow guiding plate 114 in the middle. Correspondingly, when the airflow guiding plate 110 is in the deploying position (as shown in FIG. 4B), the first airflow guiding plate 112 and the second airflow guiding plate 114 each take the shaft member 120 as the rotation axis and rotate relative to the vehicle body 52. Therefore, the rear end of the first airflow guiding plate 112 and the rear end of the second airflow guiding plate 114 each protrude downward (for example, the vehicle downward direction D shown in FIG. 4B). Under the circumstances, since the front structure of the airflow guiding plate 110 is divided into two parts (i.e., the first airflow guiding plate 112 and the second airflow guiding plate 114), the airflow guiding plate 110 is set as: the protruding amount of the first airflow guiding plate 112 is different from the protruding amount of the second airflow guiding plate 114 in the deploying position (as shown in FIG. 4B). Under the circumstances, it is preferable that the protruding amount of the first airflow guiding plate 112 provided in front of the pair of front wheels 54 in the deploying position is greater than the protruding amount of the second airflow guiding plate 114 in the deploying position. That is to say, under the assumption that the front end of the first airflow guiding plate 112 and the front end of the second airflow guiding plate 114 are located at the same level, the rear end of the first airflow guiding plate 112 is located a position lower than the rear end of the second airflow guiding plate 114 (e.g., the vehicle downward direction D shown in FIG. 4B).

It can be seen that, in this embodiment, the airflow guiding plate 110 used for the vehicle body lower structure 100 described in the first part of the present disclosure is divided into a first airflow guiding plate 112 in front of the left and right front wheels 54 and a second airflow guiding plate 114 in the center. Moreover, the protruding amount of the first airflow guiding plate 112 is different from the protruding amount of the second airflow guiding plate 114 at the deploying position. Therefore, when the airflow guiding plate 110 is at the deploying position, the flow rate of the airflow increases along with the curvature of the airflow guiding plate 110, thereby increasing the negative pressure in the vicinity of the inner side of the front wheels 54, thus increasing the negative pressure for attracting the vehicle 50 to the road surface. Accordingly, the vehicle body lower structure 100 described in the first part of the present disclosure may improve the aerodynamic performance and enhance the driving stability.

Next, the anti-collision structure of the airflow guiding plate 110 used for the vehicle body lower structure 100 is explained in the second part of the present disclosure. Referring to FIG. 3 and FIG. 5, in this embodiment, the vehicle body lower structure 100 further includes a shaft member 120, a belt member 130, and an actuator 140. For the description of the shaft member 120, please refer to the aforementioned first part. The belt member 130 is connected between the airflow guiding plate 110 and the vehicle body 52. The actuator 140 is used to wind the belt member 130. Since the front structure of the airflow guiding plate 110 is divided into two parts (i.e., the first airflow guiding plate 112 and the second airflow guiding plate 114), the following description uses the anti-collision structure consisting of the belt member 130 and the actuator 140 and provided on first airflow guiding plate 112 and the second airflow guiding plate 114 as an example (for example, the two belt members 130 shown in FIG. 5 are located on the first airflow guiding plate 112 and the second airflow guiding plate 114, respectively). However, in other embodiments that are not shown, the above-mentioned anti-collision structure composed of the belt member 130 and the actuator 140 and the like may also be provided only on one of the first airflow guiding plate 112 and the second airflow guiding plate 114. Alternatively, the front structure of the airflow guiding plate 110 may be provided with only a single plate (i.e., not divided into the first airflow guiding plate 112 and the second airflow guiding plate 114), and only one set of the above-mentioned anti-collision structures may be provided. The present disclosure is not limited thereto.

In detail, in this embodiment, the vehicle body lower structure 100 further includes a driving shaft 120a. The driving shaft 120a extends in the left-right direction (for example, the vehicle left direction L and the vehicle right direction R shown in FIG. 3 and FIG. 5) of the vehicle, and is rotatably provided on the vehicle body 52. Preferably, the driving shaft 120a is arranged parallel to the aforementioned shaft member 120 and staggered in the front and back direction. That is, the shaft member 120 is used for rotating the airflow guiding plate 110, and the driving shaft 120a is used for driving the belt member 130 (as described later). The belt member 130 is connected to the airflow guiding plate 110 at one end and the vehicle body 52 at the other end, for example, one end of the belt member 130 is connected to the corresponding first airflow guiding plate 112 or the second airflow guiding plate 114, and the other end thereof is connected to the driving shaft 120a provided on the front frame 52a of the vehicle body 52. The belt member 130 is, for example, an elastic belt, but not limited thereto. Preferably, the belt member 130 is connected to the driving shaft 120a by being wound around the driving shaft 120a, thereby being indirectly connected to the front frame 52a of the vehicle body 52. Furthermore, the actuator 140 is provided on the driving shaft 120a, and drives the driving shaft 120a to rotate, so that the belt member 130 is wound around the driving shaft 120a. However, the present disclosure does not limit the method by which the actuator 140 winds the belt member 130. For example, in other embodiments that are not shown, the driving shaft 120a may be omitted, and the belt member 130 may be wound by the shaft member 120.

Furthermore, in this embodiment, as shown in FIG. 5, the vehicle body lower structure 100 further includes a force applying member 150. The force applying member 150 is arranged on the airflow guiding plate 110 and applies a downward force to the airflow guiding plate 110. The force applying member 150 is, for example, a spring, but not limited thereto. The force applying member 150 is used to constitute a part of the aforementioned anti-collision structure, and the force applying member 150 is arranged in the vicinity of the belt member 130, so the force applying member 150 is preferably arranged on the first airflow guiding plate 112 and the second airflow guiding plate 114 like the belt member 130 described above (for example, it is shown in FIG. 5 that the two force applying members 150 are located on the upper surfaces of the first airflow guiding plate 112 and the second airflow guiding plate 114 respectively). However, in other embodiments that are not shown, the force applying member 150 may also be provided only on one of the first airflow guiding plate 112 and the second airflow guiding plate 114. Alternatively, the front structure of the airflow guiding plate 110 may only be provided with a single plate (i.e., not divided into the first airflow guiding plate 112 and the second airflow guiding plate 114), and one or more force applying members 150 may be provided. Alternatively, the force applying member 150 may be omitted, and the present disclosure is not limited thereto.

Therefore, in this embodiment, the anti-collision structure set on the first airflow guiding plate 112 is used as an example for illustration. When the airflow guiding plate 110 (for example, the first airflow guiding plate 112) is located at the receiving position (as shown in FIG. 4A), the airflow guiding plate 110 covers the lower part of the vehicle body 52, and the belt member 130 is wound around the driving shaft 120a (as shown in FIG. 6A). Correspondingly, when the airflow guiding plate 110 (e.g., the first airflow guiding plate 112) is in the deploying position (as shown in FIG. 4B), the airflow guiding plate 110 protrudes downward (e.g., the vehicle downward direction D as shown in FIG. 6B), and the driving shaft 120a is rotated by the driving of the actuator 140 (e.g., clockwise in FIG. 6B), so that the belt member 130 wound on the driving shaft 120a is released downward. In this manner, the belt member 130 extends downward along with the movement of the airflow guiding plate 110 (as shown in FIG. 6B), and may support the airflow guiding plate 110 in the deploying position. That is to say, when the airflow guiding plate 110 is in the receiving position or the deploying position, the length by which the belt member 130 extends downward is adjusted according to the rotation of the driving shaft 120a, so the belt member 130 supporting the airflow guiding plate 110 is in a straightened state when in the receiving position or the deploying position. In the meantime, the force applying member 150 exerts a downward force on the airflow guiding plate 110, so that the airflow guiding plate 110 moves downward more smoothly after being subjected to the force.

Figure 6C:
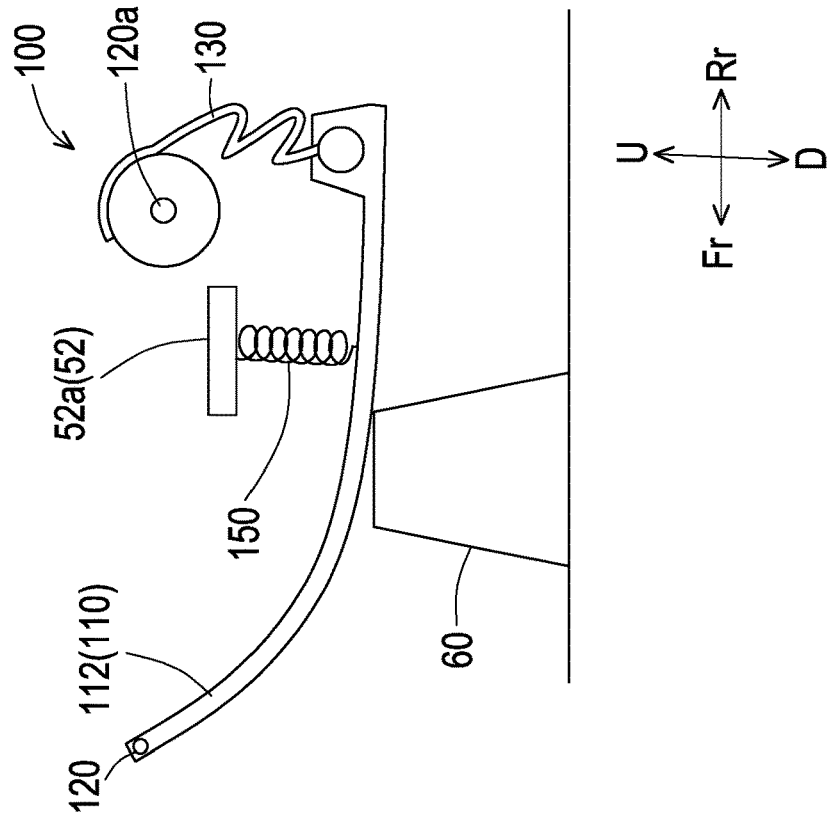

Furthermore, in this embodiment, when the airflow guiding plate 110 is in the deploying position and encounters a collision with the obstacle 60 (as shown in FIG. 6C), the airflow guiding plate 110 protruding downward (for example, the first airflow guiding plate 112) is pushed by the obstacle 60 and moves upward (for example, in the vehicle upward direction U shown in FIG. 6C). Under the circumstances, since the belt member 130 has been sufficiently released and extended downward from the driving shaft 120a, the belt member 130 is bent when the airflow guiding plate 110 moves from the deploying position to the receiving position (as shown in FIG. 6C) without interfering with the movement of the airflow guiding plate 110 towards the receiving position. In addition, since the force applying member 150 also has elasticity, the force applying member 150 may also be compressed when the airflow guiding plate 110 moves from the deploying position to the receiving position.

In addition, in this embodiment, when the airflow guiding plate 110 passes through the obstacle 60 (as shown in FIG. 6D), the compressed force applying member 150 is released, thereby applying a downward force to the airflow guiding plate 110 (for example, the first airflow guiding plate 112), so that the airflow guiding plate 110 moves downward (for example, the vehicle downward direction D shown in FIG. 6B) and is restored, that is, moves to the deploying position. Under the circumstances, the deformed belt member 130 extends downward again along with the movement of the airflow guiding plate 110, and further supports the airflow guiding plate 110 at the deploying position. That is to say, when the airflow guiding plate 110 is in the deploying position and encounters a collision with the obstacle 60 and moves unintentionally, the driving shaft 120a neither rotates nor changes the length by which the belt member 130 extends downward. Meanwhile, the belt member 130 bends through its own elasticity without interfering with the movement of the airflow guiding plate 110 toward the receiving position, so the belt member 130 can not only be used as a supporting member to support the airflow guiding plate 110, but also can prevent the airflow guiding plate 110 from being damaged due to collision through deformation.

It can be seen that, in this embodiment, the airflow guiding plate 110 used for the vehicle body lower structure 100 described in the second part of the present disclosure is provided with an anti-collision structure composed of the belt member 130, the actuator 140, etc. When the airflow guiding plate 110 is in the deploying position, the airflow guiding plate 110 may be supported through the connection of the belt member 130. When the airflow guiding plate 110 encounters the obstacle 60, the belt member 130 bends without interfering with the movement of the airflow guiding plate 110 toward the receiving position. Thus, it is possible to avoid damage to the airflow guiding plate 110. Accordingly, the vehicle body lower structure 100 described in the second part of the present disclosure may improve the aerodynamic performance, and may suppress the impact on the airflow guiding plate 110 when the airflow guiding plate 110 encounters the obstacle 60.

Next, the anti-overexpansion structure of the airflow guiding plate 110 used for the vehicle body lower structure 100 is explained in the third part of the present disclosure. Referring to FIG. 3 and FIG. 5, in this embodiment, the vehicle body lower structure 100 further includes a hook member 160. The hook member 160 is provided on the upper surface of the airflow guiding plate 110, and is provided in the vicinity of the buckle part 52b closed to the vehicle body 52. Therefore, depending on the state of the airflow guiding plate 110 (i.e., in the receiving position or the deploying position), the hook member 160 is separated from the buckle part 52b or locked on the buckle part 52b along with the movement of the airflow guiding plate 110. Since the front structure of the airflow guiding plate 110 is divided into two parts (i.e., the first airflow guiding plate 112 and the second airflow guiding plate 114), the following description uses the anti-overexpansion structure composed of the hook member 160 and the buckle part 52b and arranged on the second airflow guiding plate 114 as an example for illustration (for example, the hook member 160 shown in FIG. 3 and FIG. 5 is set on the second airflow guiding plate 114). However, in other embodiments that are not shown, the anti-overexpansion structure formed by the hook member 160 and the buckle part 52b may also be provided only on the first airflow guiding plate 112, or provided in multiple sets on the first airflow guiding plate 112 and the second airflow guiding plate 114. Alternatively, the front structure of the airflow guiding plate 110 may not only be provided with a single plate (i.e., not divided into the first airflow guiding plate 112 and the second airflow guiding plate 114), and one or more hook members 160 may be provided. The present disclosure is not limited thereto.

In detail, in this embodiment, the buckle part 52b is, for example, a connection structure formed by a part of the front frame 52a of the vehicle body 52, for example, a crossbar extending in the left-right direction of the vehicle (for example, the vehicle left direction L and vehicle right direction R shown in FIG. 3 and FIG. 5), but not limited thereto. Correspondingly, the hook member 160 is provided on the upper surface of the airflow guiding plate 110 (e.g., the second airflow guiding plate 114), and the hook member 160 has a claw part 162 protruding toward the rear of the vehicle (e.g., the vehicle rear direction Rr shown in FIG. 3 and FIG. 5), and the hook member 160 is located in front of the buckle part 52b (for example, in the vehicle front direction Fr shown in FIG. 3 and FIG. 5). The claw part 162 is located at a position higher than the buckle part 52b. Further, the front end of the airflow guiding plate 110 is rotatably connected to the vehicle body 52 through a shaft member 120 extending in the left-right direction of the vehicle (e.g., the vehicle left direction L and the vehicle right direction R shown in FIG. 3 and FIG. 5). The hook member 160 is fixed to the buckle part 52b at a position further rearward than the shaft member 120 (for example, toward the vehicle rearward direction Rr further shown in FIG. 5). That is to say, the fixing portion (i.e., the claw part 162) of the hook member 160 for fixing to the buckle part 52b is located more rearward than the shaft member 120, but the present disclosure is not limited thereto.

Thus, in the present embodiment, when the airflow guiding plate 110 (e.g., the second airflow guiding plate 114) is located at the receiving position (as shown in FIG. 4A), the hook member 160 is separated from the buckle part 52b of the vehicle body 52 (as shown in FIG. 7A), that is, the claw part 162 of the hook member 160 is located above the buckle part 52b and is separated by a distance. Correspondingly, when the airflow guiding plate 110 (e.g., the second airflow guiding plate 114) is in the deploying position (as shown in FIG. 4B), the hook member 160 is locked onto the buckle part 52b of the vehicle body 52 (as shown in FIG. 7B). That is, the claw part 162 of the hook member 160 moves downward from above and abuts against the upper surface of the buckle part 52b, whereby the claw part 162 of the hook member 160 interferes with the buckle part 52b in the up-down direction of the vehicle. Here, when the airflow guiding plate 110 (e.g., the second airflow guiding plate 114) moves between the receiving position and the deploying position, the hook member 160 moves up and down along with the movement of the airflow guiding plate 110. Under the circumstances, since the hook member 160 is positioned in front of the buckle part 52b, the vertical movement of the hook member 160 does not interfere with the buckle part 52b. In addition, since the claw part 162 of the hook member 160 protrudes rearward and is positioned above the buckle part 52b, the up and down movement of the hook member 160 causes the claw part 162 to move away from or approach the buckle part 52b, and thus the hook member 160 and the buckle part 52b is separated from or locked onto the buckle part 52b.

It can be seen that, in this embodiment, the airflow guiding plate 110 used for the vehicle body lower structure 100 described in the third part of the present disclosure is provided with an anti-overexpansion structure formed by the hook member 160, the claw part 162 and the buckle part 52b, etc. When the airflow guiding plate 110 is located in the deploying position, the airflow guiding plate 110 may be supported by the buckle part 52b of the hook member 160 locked onto the vehicle body 52, thereby inhibiting the airflow guiding plate 110 from being over-expanded or detached. When the airflow guiding plate 110 is in the receiving position, the hook member 160 is separated from the buckle part 52b, so the setting of the hook member 160 does not affect the movement of the airflow guiding plate 110 between the receiving position and the deploying position. Accordingly, the vehicle body lower structure 100 described in the third part of the present disclosure may improve the aerodynamic performance, and inhibit the airflow guiding plate 110 from being over-expanded or detached.

Finally, the rear structure of the airflow guiding plate 110 used for the vehicle body lower structure 100 is described in the fourth part of the present disclosure. Please refer to FIG. 1 to FIG. 3, in this embodiment, the airflow guiding plate 110 includes a front airflow guiding plate and a rear airflow guiding plate 116. The front airflow guiding plate is, for example, the second airflow guiding plate 114 described in the first part of the present disclosure, and the rear airflow guiding plate 116 is connected behind the front airflow guiding plate (the second airflow guiding plate 114) (for example, the vehicle rear direction Rr as shown in FIG. 1 to FIG. 3). Thus, the airflow guiding plate 110 is divided into two parts (i.e., the front airflow guiding plate and the rear airflow guiding plate 116) in the front-rear direction of the vehicle (for example, the vehicle front direction Fr and the vehicle rear direction Rr shown in FIG. 1 to FIG. 3), so different settings may be made. For example, the orientation of the front airflow guiding plate (the second airflow guiding plate 114) is different from the orientation of the rear airflow guiding plate 116 in the deploying position (as shown in FIG. 4B).

Specifically, in this embodiment, as shown in FIG. 3, FIG. 4A and FIG. 4B, the vehicle body lower structure 100 further includes a shaft member 120. The front airflow guiding plate (the second airflow guiding plate 114) is rotatably arranged on the vehicle body 52 with its front end (for example, corresponding to the end portion in the vehicle front direction Fr in FIG. 1 to FIG. 3). For example, the front end of the front airflow guiding plate (the second airflow guiding plate 114) is rotatably connected to the vehicle body 52 through the shaft member 120. The rear end (for example, corresponding to the end portion in the vehicle rear direction Rr in FIG. 1 to FIG. 3) of the front airflow guiding plate (second airflow guiding plate 114) is connected to the rear airflow guiding plate 116. Correspondingly, the rear airflow guiding plate 116 is rotatably arranged with its front end on the rear end of the front airflow guiding plate (second airflow guiding plate 114), and its rear end is slidably arranged on the vehicle body 52 (as shown in FIG. 3) in the front-rear direction of the vehicle (for example, the vehicle front direction Fr and the vehicle rear direction Rr as shown in FIG. 1 to FIG. 3). For example, the front end of the rear airflow guiding plate 116 is rotatably arranged on the rear end of the front airflow guiding plate (the second airflow guiding plate 114) through the rotating shaft 114a, and then the rear end of the rear airflow guiding plate 116 is slidably set on the rear frame 52c of the vehicle body 52 through the sliding pins 116a. The rear end of the rear airflow guiding plate 116 refers to the part opposite to the front end, as long as the setting point is at the rear part of the front and rear parts of the rear airflow guiding plate 116, and the present disclosure is not limited thereto.

More specifically, as shown in FIG. 3 and FIG. 8, in this embodiment, the rear frame 52c of the vehicle body 52 may be provided in a pair of left and right sliding grooves 52d extending in the front-rear direction of the vehicle (for example, the vehicle front direction Fr and the vehicle rear direction Rr shown in FIG. 1 to FIG. 3), and a pair of left and right sliding pins 116a may be provided on the upper surface of the rear airflow guiding plate 116. The sliding pins 116a are, for example, pins provided on the base 116b protruding upward from the upper surface of the rear airflow guiding plate 116. Further, the sliding groove 52d is provided outside the sliding pin 116a in the width direction of the vehicle (for example, the vehicle left direction L and the vehicle right direction R shown in FIG. 3 and FIG. 8), and the sliding pin 116a extends outward. Therefore, the sliding pin 116a may be fitted in the sliding groove 52d, and the sliding pin 116a may slide in the sliding groove 52d with the movement of the rear airflow guiding plate 116. However, in other embodiments that are not shown, the positions of the sliding groove 52d and the sliding pin 116a may also be exchanged. For example, the sliding groove 52d is provided on the inner side of the sliding pin 116a and the sliding pin 116a extends inward, or the sliding groove 52d is provided on the rear airflow guiding plate 116 and the sliding pin 116a is arranged on the vehicle body 52, or other structures that slide through fitting may be used as sliding members, which are not limited in the present disclosure.

Furthermore, please refer to FIG. 3 and FIG. 9, FIG. 9 is a partial enlarged view of a part of the rear structure of the vehicle body lower structure 100 shown in FIG. 3 (for example, the range covered by the area A of FIG. 3), which clearly shows the guiding member 170 at the rear end of the airflow guiding plate 116. In this embodiment, the vehicle body lower structure 100 further includes a guiding member 170. The guiding member 170 is arranged between the vehicle body 52 and the rear airflow guiding plate 116 to guide the movement of the airflow guiding plate 110 to the deploying position. The guiding member 170 includes a recess 172 provided on the vehicle body 52 and a convex column 174 provided at the rear end of the rear airflow guiding plate 116. The recess 172 is, for example, a C-shaped recess, and the convex column 174 is, for example, a pin disposed on the abutment 176 protruding upward from the upper surface of the rear airflow guiding plate 116. Further, the recess 172 is provided on the outer side of the convex column 174 in the width direction of the vehicle (e.g., the vehicle left direction L and the vehicle right direction R shown in FIG. 3 and FIG. 9), and the convex column 174 extends outward. Therefore, the convex column 174 may be fitted into the recess 172, and the convex column 174 may slide in the recess 172 along with the movement of the rear airflow guiding plate 116. However, in other embodiments that are not shown, the positions of the recess 172 and the convex column 174 may also be exchanged. For example, the recess 172 is provided on the inner side of the convex column 174 and the convex column 174 extends inward, or the recess 172 is provided on the rear airflow guiding plate 116 and the convex column 174 is disposed on the vehicle body 52, or other structures that can slide through fitting may be used as the guiding members, which are not limited in the present disclosure.

Thus, in this example, when the airflow guiding plate 110 is in the receiving position (as shown in FIG. 4A), the front airflow guiding plate (the second airflow guiding plate 114) and the rear airflow guiding plate 116 cover the lower part of the vehicle body 52. Correspondingly, when the airflow guiding plate 110 is in the deploying position (as shown in FIG. 4B), the front airflow guiding plate (the second airflow guiding plate 114) rotates relative to the vehicle body 52 with the shaft member 120 as the rotation axis, so the rear end of the front airflow guiding plate (the second airflow guiding plate 114) moves downward. Under the circumstances, the front end of the rear airflow guiding plate 116 is connected to the rear end of the front airflow guiding plate (the second airflow guiding plate 114), so the front end of the rear airflow guiding plate 116 rotates relative to the vehicle body 52 with the rotation axis 114a as the rotation axis, and then the front end of the rear airflow guiding plate 116 moves downward. In addition, the rear end of the rear airflow guiding plate 116 slides forward through the cooperation of the sliding pin 116a and the sliding groove 52d, and the convex column 174 of the guiding member 170 moves along the recess 172 to guide the movement of the rear airflow guiding plate 116.

Under the circumstances, since the airflow guiding plate 110 is divided into two parts (i.e., the front airflow guiding plate and the rear airflow guiding plate 116) in the front-rear direction of the vehicle (for example, the vehicle front direction Fr and the vehicle rear direction Rr shown in FIG. 1 to FIG. 3), so the airflow guiding plate 110 is set as follows: the orientation of the front airflow guiding plate (the second airflow guiding plate 114) is different from the orientation of the rear airflow guiding plate 116 in the deploying position (as shown in FIG. 4B). That is to say, the front end of the front airflow guiding plate (the second airflow guiding plate 114) rotates with the shaft member 120 as the rotation axis, so that the rear end of the front airflow guiding plate (the second airflow guiding plate 114) moves downward. Correspondingly, the front end of the rear airflow guiding plate 116 is driven by the rear end of the front airflow guiding plate (the second airflow guiding plate 114) and moves downward, so the front end of the rear airflow guiding plate 116 takes the rotation axis 114a as the rotation axis and rotates relative to the vehicle body 52. The rear end of the rear airflow guiding plate 116 slides in the front-rear direction of the vehicle through the cooperation of the sliding pin 116a and the sliding groove 52d as well as the guidance of the guiding member 170. Therefore, the front airflow guiding plate (the second airflow guiding plate 114) has the upper surface facing the back when in the deploying position, while the rear airflow guiding plate 116 has the upper surface facing the front when in the deploying position. Accordingly, the orientation of the front airflow guiding plate (the second airflow guiding plate 114) is different from the orientation of the rear airflow guiding plate 116 in the deploying position (as shown in FIG. 4B). For example, the airflow guiding plate 110 forms a V shape, but the present disclosure is not limited thereto.

It can be seen that, in the embodiment, the airflow guiding plate 110 used for the vehicle body lower structure 100 described in the fourth part of the present disclosure is divided into the front airflow guiding plate (the second airflow guiding plate 114) and the rear airflow guiding plate 116. Therefore, when the airflow guiding plate 110 is in the deploying position, the rear airflow guiding plate 116 slides forward, so that the front airflow guiding plate (the second airflow guiding plate 114) and the rear airflow guiding plate 116 have different orientations in the deploying position, so the flow rate of airflow may be increased along with the airflow guiding plate 110. Accordingly, the vehicle body lower structure 100 described in the fourth part of the present disclosure may guide the airflow on the airflow guiding plate 110 and may improve the aerodynamic performance.

To sum up, in the vehicle body lower structure of the present disclosure, the airflow guiding plate is set on the vehicle body of the vehicle, and is movable between the receiving position covering the lower part of the vehicle body and the deploying position protruding downward to improve the aerodynamic performance. In the vehicle body lower structure described in the first part of the present disclosure, the airflow guiding plate is divided into a first airflow guiding plate in front of a pair of left and right front wheels and a second airflow guiding plate in the center, so that the protruding amount of the first airflow guiding plate and the protruding amount of the second airflow guiding plate in the deploying position are set to be different, thereby improving the driving stability. Furthermore, in the vehicle body lower structure described in the second part of the present disclosure, when the airflow guiding plate is in the deploying position, the airflow guiding plate may be supported through the connection of the belt member. When the airflow guiding plate encounters obstacles, the belt member is bent without interfering with the movement of the airflow guiding plate toward the receiving position, thereby inhibiting the impact on the airflow guiding plate when the airflow guiding plate encounters an obstacle. Moreover, in the vehicle body lower structure described in the third part of the present disclosure, when the airflow guiding plate is located in the deploying position, the airflow guiding plate may be supported by the buckle part of the hook member locked onto the vehicle body, thereby inhibiting the airflow guiding plate from being over-expanded or detached. In addition, in the vehicle body lower structure described in the fourth part of the present disclosure, the airflow guiding plate is divided into a front airflow guiding plate and a rear airflow guiding plate. When the airflow guiding plate is in the deploying position, the rear airflow guiding plate slides forward, so that the orientation of the front airflow guiding plate is different from the orientation of the rear airflow guiding plate. In this manner, the flow rate of the airflow on the airflow guiding plate may be increased and the aerodynamic performance may be improved. The vehicle body lower structure of the present disclosure may be provided with the structures described in the first part to the fourth part simultaneously, or at least one of them may be provided according to requirements. The present disclosure is not limited thereto, and may be adjusted according to requirements.

Finally, it should be noted that: the above embodiments are only used to illustrate the technical solutions of the present disclosure, but not to limit them; although the present disclosure has been described in detail with reference to the foregoing embodiments, those of ordinary skill in the art should understand: modifications may still be made to the technical solutions described in the foregoing embodiments, or some or all of the technical features thereof are equivalently replaced; and these modifications or replacements do not make the essence of the corresponding technical solutions depart from the scope of the technical solutions of the embodiments of the present disclosure.

What is claimed is:

1. A vehicle body lower structure, comprising an airflow guiding plate that is arranged on a vehicle body of a vehicle and is movable between a receiving position covering a lower part of the vehicle body and a deploying position protruding downward, wherein the vehicle body lower structure further comprises:
   a hook member, which is provided on an upper surface of the airflow guiding plate, wherein
   when the airflow guiding plate is located at the receiving position, the hook member is separated from a buckle part of the vehicle body, and when the airflow guiding plate is in the deploying position, the hook member is locked onto the buckle part of the vehicle body,
   the buckle part is a part of a front frame of the vehicle body, and the buckle part is formed by a crossbar extending in a left-right direction of the vehicle.

2. The vehicle body lower structure according to claim 1, wherein
   a front end of the airflow guiding plate is rotatably connected to the vehicle body through a shaft member extending in a left-right direction of the vehicle, and
   the hook member is fixed to the buckle part at a position further rearward than the shaft member.

3. The vehicle body lower structure according to claim 2, wherein
   the hook member has a claw part protruding toward the rear of the vehicle, and
   the claw part is located at a position higher than the buckle part.

4. The vehicle body lower structure according to claim 1, wherein the front frame is disposed at a lower part of a front of the vehicle, and the front frame is disposed adjacent to a pair of left and right front wheels.

5. The vehicle body lower structure according to claim 1, wherein the front frame includes a pair of side frames extending in a front-rear direction of the vehicle, and the crossbar connects the pair of side frames.

6. The vehicle body lower structure according to claim 5, wherein the front frame includes:
   a first bulge part extending from one of the pair of side frames to an outside in the left-right direction of the vehicle; and
   a second bulge part extending from another of the pair of side frames to the outside in the left-right direction of the vehicle,
   wherein in the front-rear direction of the vehicle, the crossbar overlaps with the first bulge part and the second bulge part.

* * * * *